United States Patent [19]

Ueda

[11] 3,860,750

[45] Jan. 14, 1975

[54] NOISE CANCELLER CIRCUIT FOR TELEVISION SYNC SEPARATOR

[75] Inventor: Seiichi Ueda, Tokyo, Japan

[73] Assignee: Hitachi, Ltd., Tokyo, Japan

[22] Filed: Apr. 2, 1973

[21] Appl. No.: 346,895

[30] Foreign Application Priority Data

Mar. 31, 1972 Japan ............................... 47-31675

[52] U.S. Cl. ......................... 178/7.3 S, 178/DIG. 12

[51] Int. Cl. ........................... H04n 5/08, H04n 5/21

[58] Field of Search ............ 178/7.3 R, 7.3 S, 7.5 S, 178/DIG. 12

[56] References Cited

UNITED STATES PATENTS 2,286,450 6/1942 White et al. ...................... 178/7.5 S 3,564,129 2/1971 Blaxtan ....................... 178/DIG. 12

3,715,488 2/1973 Takise et al. ..................... 178/7.3 S

FOREIGN PATENTS OR APPLICATIONS 741,572 12/1955 Great Britain .............. 178/DIG. 12

*Primary Examiner*—Robert L. Griffin

*Assistant Examiner*—George S. Stellar

*Attorney, Agent, or Firm*—Craig & Antonelli

[57] ABSTRACT

A noise canceller circuit for television, wherein the level difference between the peak value of a synchronizing signal and a noise cancelling level is variable, so as to prevent erroneous operation of said circuit wherein, when the peak value of said synchronizing signal becomes larger, it is cancelled as a noise.

9 Claims, 9 Drawing Figures

NOISE CANCELLER CIRCUIT FOR TELEVISION SYNC SEPARATOR

BACKGROUND OF THE INVENTION

1. Field of the Invention

The present invention relates to noise canceller circuits, and more particularly to a noise canceller circuit for television in which the noise cancellation level difference can be changed in dependence on the condition of the compound video signals.

2. Description of the Prior Art

The expression "noise cancellation level difference" $V_N$ in discussion of the present invention refers to the level difference ($V_{CAN} - V_P$) between the peak value $V_P$ of synchronizing signals and the noise cancelling level $V_{CAN}$ at which noises are cancelled. In other words, signals located at levels higher than the level of the peak synchronization value $V_P$ by more than the noise cancellation level difference $V_N$ are cancelled by means of the noise canceller circuit.

As an automatic gain control circuit (hereinafter termed the AGC circuit) in a television receiver, a keyed AGC circuit and a peak value type AGC circuit are often used.

The keyed AGC circuit picks out compound video signals only during the period of the horizontal synchronizing pulses by sampling, for example, the flyback pulses, and utilizes as a detected AGC output the selected outputs as averaged by a capacitor and a resistor. In this case, the asynchronism between the horizontal synchronizing signal separated in the receiving set and the sampling pulse becomes a problem.

On the other hand, the peak value type AGC circuit utilizes the peak value of the synchronizing signal of the compound video signal as the detected AGC circuit, so that it is free from the problem as stated above. However, it is ineffective for pulsative noises such as ignition noises of an automobile, and requires a noise canceller circuit of high performance.

For the noise canceller circuit, there is a system in which a noise pulse is separated from among the compound video signal and is added in the opposite polarity to the original signal, to thereby cancel the noise component, and a system has also been proposed in which an input circuit to a synchronization separator circuit is disconnected during the period of the noise pulse. The noise cancellation level difference $V_N$ in these noise canceller circuits has heretofore been fixed, and the problems as will now be described with reference to FIGS. 1*a*, 1*b* and 1*c* have arisen. In the figures, $V_{in}$ designates compound video signals which are input signals of the noise canceller circuit, while $V_{out}$ indicates output signals of the noise canceller circuit. FIGS. 1(*a*), 1(*b*) and 1(*c*) correspond respectively to a case where the compound video signal is normal, a case where a noise is superposed on a synchronizing signal and a case where the synchronizing signal exceeds the noise removing voltage or the aforesaid noise cancelling level ($V_P + V_N$).

Problem (1)

As illustrated in FIG. 1*b*, in the case where the synchronizing signal is superposed on the noise and where the level of the superposed signal becomes higher than the noise cancelling level $V_{CAN}$ above the peak synchronization value, the output signal $V_{out}$ has a wave form with a part deleted.

Problem (2)

Illustrated in FIG. 1*c* is the case where the peak value $V_P$ of the synchronizing signal is higher than the usual peak synchronization value $V_P$ by more than the noise cancellation level difference $V_N$. This case results, for example, when the level of the signals shifts abruptly due to an abrupt change in the field strength of television waves to the extent that the AGC circuit cannot follow the change. In this case, the output signal $V_{out}$ has a wave form in which the synchronizing signal disappears to leave the pedestal (horizontal retrace pulse). Once such erroneous operation of the noise canceller circuit has occurred, the black level $V_B$ of the compound video signal being slightly lower than the peak value is detected as the peak value in the peak value type AGC circuit in spite of the fact that the peak value $V_P$ of the synchronizing signal has risen. Therefore, the AGC circuit does not operate in the direction which will produce a lowering of the gain. It is accordingly feared that the synchronizing signal with the primary signal erased and the unnecessary horizontal retrace pulse left behind will thereafter continue to appear on the output side of the synchronization separator circuit as the subsequent stage.

SUMMARY OF THE INVENTION

The principal object of the present invention is to provide a noise canceller circuit capable of preventing the erroneous function in which, when the peak value of a synchronizing signal becomes large, it is cancelled as a noise.

Another object of the present invention is to provide a noise canceller circuit which prevents a synchronizing signal from being partially removed by a noise.

Still another object of the present invention is to provide a noise canceller circuit which can prevent the aforesaid erroneous function without degrading the noise separating performance at the usual time.

Yet another object of the present invention is to provide a noise canceller circuit which has a variable noise cancelling level.

According to the present invention, there is provided a noise canceller circuit which is constructed such that, during a period in which a compound video signal is in the state of a synchronizing pulse, the noise cancelling level is made higher than usual.

Accordingly, when the compound video signal is under the state of the sychronizing pulse, the malfunction that the synchronizing signal is erased by the noise canceller circuit is difficult to occur because the noise cancelling level is then higher. On the other hand, at the usual time, namely, when the compound video signal is not under the state of the synchronizing signal, the fear that the noise separating performance of the noise canceller circuit is degraded is not raised because the noise cancelling level is lowered again.

The other objects, features and advantages of the present invention will become apparent from the following description taken in conjunction with the accompanying drawings.

PREFERRED EMBODIMENTS OF THE INVENTION

Figure 2:
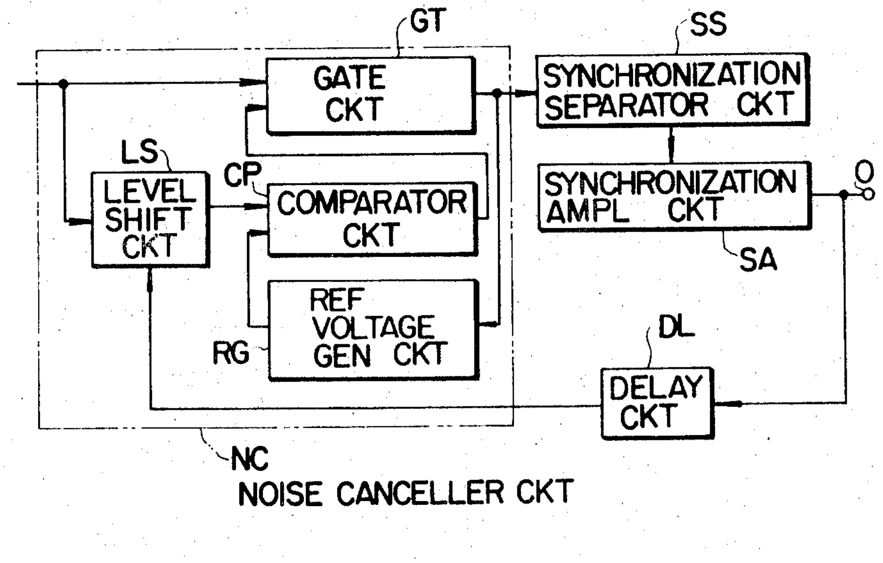
FIG. 2 is a block diagram showing an embodiment of a noise canceller circuit according to the present invention.

FIG. 2 is a block diagram showing a synchronizing circuit and an embodiment of a noise canceller circuit according to the present invention, in which NC designates the noise canceller circuit.

The noise canceller circuit NC comprises a level shift circuit LS, a gate circuit GT, a comparator circuit CP and a reference voltage generator circuit RG.

A compound video signal fed to an input terminal I of the noise canceller circuit can pass through the gate circuit GT when an output of the comparator CP is of a specified state. Supplied to the comparator CP are a signal produced by level-shifting the compound video signal DC-wise by means of the level shifter LS, and a reference signal $V_1$ generated by the reference voltage generator RG and corresponding to the peak value $V_P$ of the compound video signal. The comparator CP compares the magnitudes of the voltage values of both signals, so as to control the gating of the gate circuit GT by an output thereof.

A synchronization separator circuit SS of conventional configuration separates the synchronizing signal from the compound video signal fed thereto via the noise canceller circuit NC. A synchronization amplifier circuit SA amplifies the separated synchronizing signal.

At an output terminal O, there appears the amplified synchronizing signal thus separated from the compound video signal. The synchronizing signal is fed-back through a delay circuit DL to the level shifter LS of the noise canceller circuit NC, to control the magnitude of the level shift of the level shifter LS.

The operation of the noise canceller circuit thus constructed will now be explained for the cases of the absence of a synchronizing pulse and the presence of the same.

Figures 5A, 5B, 5C:
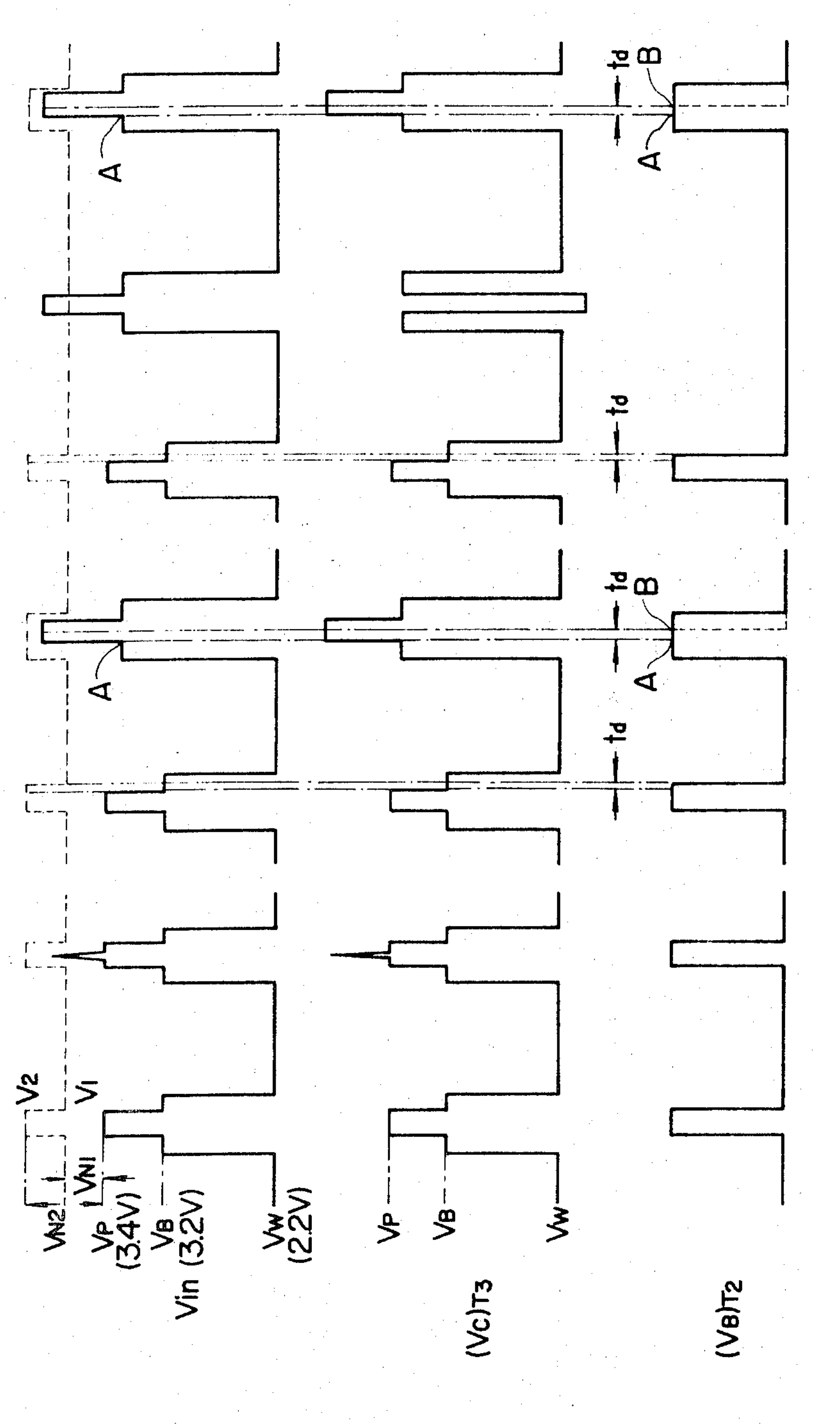

1. In the absence of the synchronizing pulse:

Relative to the reference voltage generated by the reference voltage generator RG and following the peak synchronization value, the peak synchronization value of the compound video signal fed through the level shifter LS to the comparator CP becomes normally lower by a voltage value $V_{N1}$, as seen in FIG. 5*a*. The comparator CP opens the gate of the gate circuit GT in the case where the reference voltage is higher than the voltage of the level-shifted compound video signal. In contrast, the gate is closed in the opposite case. Accordingly, when a noise exceeding the peak synchronization value by more than the voltage value $V_{N1}$ is applied to the input terminal I, the gate of the gate circuit GT remains closed to cancel the noise. Herein, it will be understood that the voltage value $V_{N1}$ corresponds to the aforesaid noise cancellation level difference.

Figures 1A, 1B, 1C:
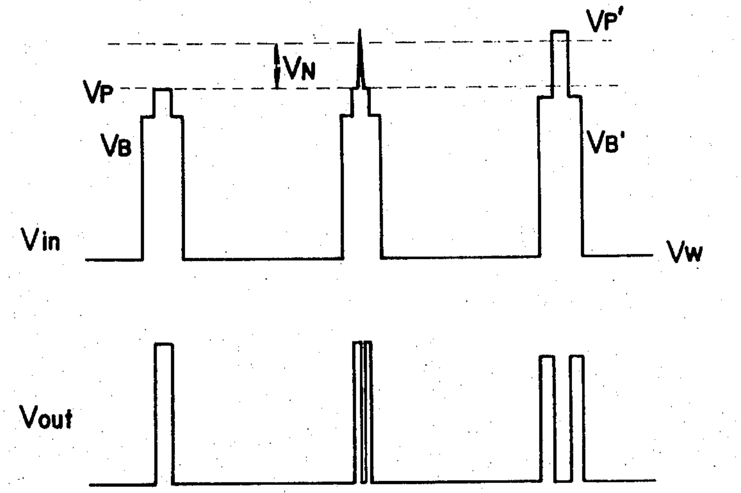
FIGS. 1*a* to 1*c* are diagrams for explaining erroneous operations of the prior-art noise cancelling circuit as has already been stated.

2. In the presence of the synchronizing pulse:

The synchronizing signal fed-back through the delay circuit DL to the noise canceller circuit NC, acts to make the level shift value of the level shifter LS still larger. The difference between the level-shifted compound video signal and the reference voltage becomes a voltage value $V_{N2}$ ($V_{N2} > V_{N1}$). The noise cancellation level difference is accordingly enlarged from $V_{N1}$ to $V_{N2}$ during the period in which the synchronizing pulse is present. As a result, the malfunction as illustrated in FIGS. 1*b* and 1*c* in which a part or the whole of the synchronizing signal is deleted is effectively prevented.

Figure 3:
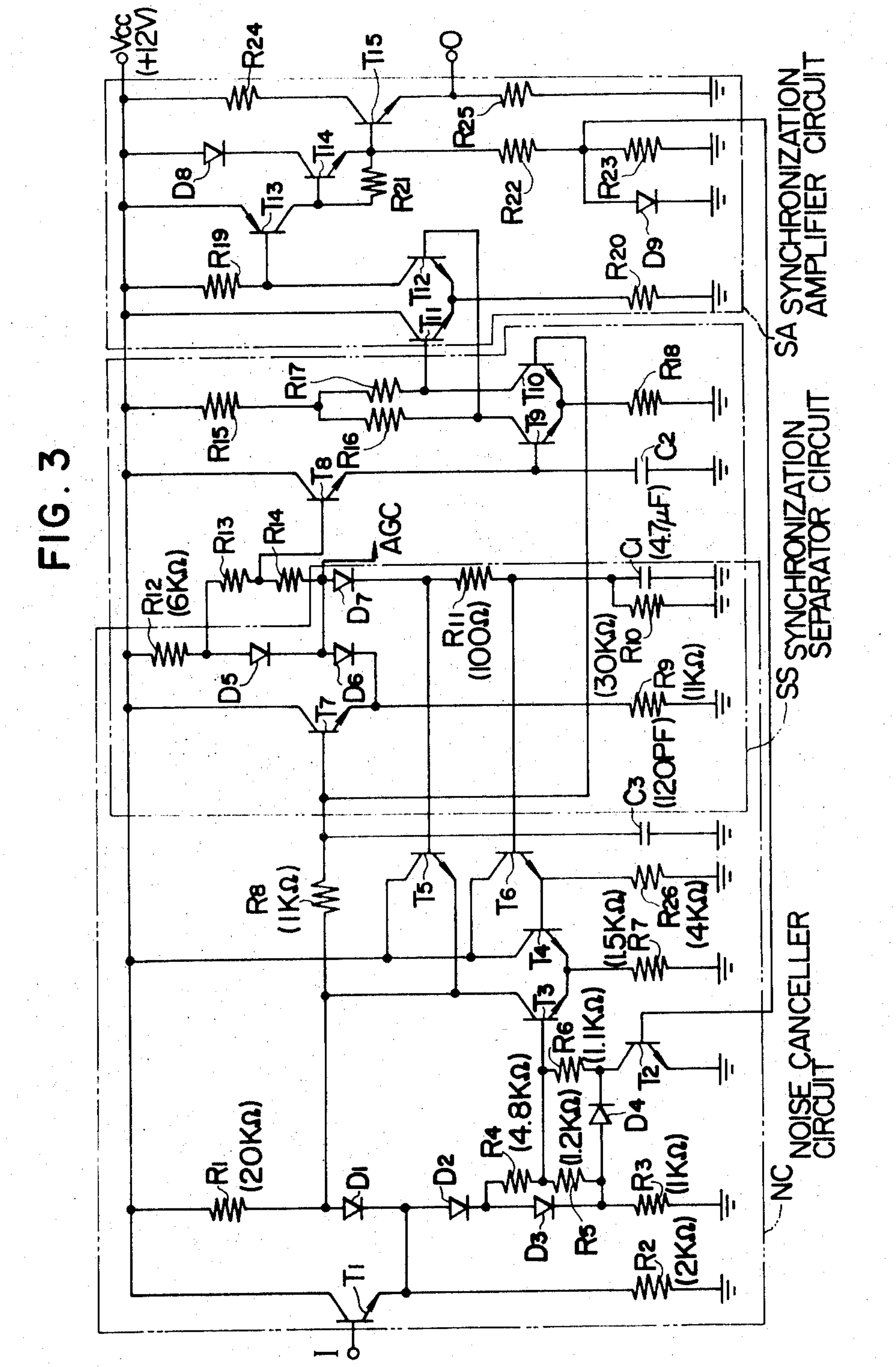
FIG. 3 is a schematic circuit diagram of the circuit of FIG. 2.

FIG. 3 shows a more practical embodiment of the noise canceller circuit NC and the synchronizing circuit SS and amplifier SA which are illustrated in the block diagram of FIG. 2.

Referring to the figure, transistors $T_1$ and $T_2$, diodes $D_1 - D_4$ and resistors $R_1 - R_6$ constitute the level shifter circuit LS. A diode $D_7$, resistors $R_{10}$ and $R_{11}$, a capacitor $C_1$ and a transistor $T_6$ constitute a part of the reference voltage generator circuit RG. Transistors $T_3$ and $T_4$ and a resistor $R_7$ constitute a differential amplifier, which functions as the comparator circuit CP. The diode $D_1$ also forms the principal part of the gate circuit GT. As the delay circuit DL, a saturation type transistor $T_{13}$ of the synchronization amplifier circuit SA is also used.

The transistor $T_1$ has the compound video signal applied to the base electrode, has the collector electrode connected to a DC power source $V_{CC}$, and has the emitter electrode grounded through the resistor $R_2$. The diode $D_1$ and a resistor $R_1$ are squentially connected in series between the emitter electrode of the transistor $T_1$ and the power source $V_{CC}$, while the diodes $D_2$ and $D_3$ and the resistor $R_3$ are sequentially connected in series between the emitter electrode of the transistor $T_1$ and a grounding terminal. The resistors $R_4$ and $R_5$ are connected between the anode and cathode electrodes of the diode $D_3$, while the resistor $R_6$ and the diode $D_4$ are connected between both the terminals of the resistor $R_5$. The collector electrode of the transistor $T_2$ is connected to the juncture between the diode $D_4$ and the resistor $R_6$, and the emitter electrode is grounded. The base electrode of the transistor $T_2$ has the synchronizing signal applied thereto from an intermediate part of the synchronization amplifier SA. The emitter electrodes of the transistors $T_3$ and $T_4$ are both grounded through the resistor $R_7$, while the respective collector electrodes thereof are connected to the anode electrode of the diode $D_1$ and to the power source $V_{CC}$. A resistor $R_8$ and a capacitor $C_3$ constitute a low-pass filter, through which the compound video signal having passed through the diode $D_1$ is applied to the base electrode of a transistor $T_7$. The collector electrode of the transistor $T_7$ is connected to the power source $V_{CC}$, and the emitter electrode is grounded through a resistor $R_9$. Diodes $D_6$ and $D_5$ and a resistor $R_{12}$ are successively connected in series between the emitter and collector of the transistor $T_7$. The diode $D_7$, the resistor $R_{11}$ and the capacitor $C_1$ are successively connected in series between the anode electrode of the diode $D_6$ and the ground. In parallel with the capacitor $C_1$, the resistor $R_{10}$ is connected. The collector electrodes of a transistor $T_5$ and the transistor $T_6$ are both connected to the power source $V_{CC}$, the respective base electrodes are connected to the opposite terminals of the resistor $R_{11}$, and the emitter electrode of the transistor $T_5$ is connected to the collector electrode of the transistor $T_3$. The bases of the transistors $T_3$ and $T_4$ are respectively connected to the juncture among the resistors $R_4 - R_6$ and to the emitter electrode of the transistor $T_6$.

The diode $D_7$, the resistors $R_{10}$ and $R_{11}$ and the capacitor $C_1$ are utilized not only for producing the reference voltage, but also they function as a noise suppressor filter which suppresses to the peak synchronization value a noise of a level slightly higher than the peak synchronization value as has not been perfectly cancelled by the noise canceller circuit. The transistor $T_7$, the resistors $R_9$ and $R_{12}$ and the diodes $D_5$ and $D_6$ constitute a level shifter circuit which is provided for the synchronization separator circuit SS, and which is not directly concerned with the noise canceller circuit. However, the foregoing reference voltage generator circuit or the noise suppressor filter is more preferably located on the output side of the transistor $T_7$ as in the figure than on the input side. If the discharge time constant dependent on the resistor $R_{10}$ and the capacitor $C_1$ is appropriately selected, the noise suppressor filter can also be operated as a peak value detector circuit of the peak vlue type AGC circuit.

The noise canceller circuit NC and the synchronization circuit SS and amplifier SA, as shown in FIG. 3, are all formed within an integrated semiconductor circuit except for the capacitors therein. As the diodes, transistors are utilized in the form with the bases and collectors connected. Consequently, temperature changes due to the forward voltage drops of the diodes $D_2$, $D_3$, $D_4$ and $D_7$ and the transistors $T_1$ and $T_6$ employed in the level shifter LS and the reference voltage generator RG, which determine the noise cancellation level difference, are cancelled from each other, so that the noise cancellation level difference is stable against temperature changes.

The transistor $T_5$ is incorporated so that, when the transistor $T_3$ is rendered conductive to close the diode gate $D_1$, it may be prevented from being saturated. More specifically, in case where the transistor $T_3$ is saturated, the switching time in which the noise canceller circuit is rendered operative and is then rendered inoperative becomes long due to the accumulation effect of carriers. For this reason, the transistor $T_5$ avoids lowering of the collector potential of the transistor $T_3$ while permitting a current to flow through the transistor $T_3$, and thereby prevents the transistor $T_3$ from coming into the saturation region.

The operation of the noise canceller circuit thus constructed will be described hereunder with reference to characteristic diagrams in FIGS. 4 and 5.

First, description will be made of how the noise cancellation level difference changes.

Letting $V_P$ be the peak synchronization value of the compound video signal applied to the input terminal I, and $V_{BE}$ be all the forward voltage drops of the diodes and transistors, a voltagee $(V_B)$ $T_4$ impressed on the base electrode of the transistor $T_4$ is expressed by:

$$(V_B)\ T_4 = V_P - 2\ V_{BE}$$

(the voltage drop by the resistor $R_{11}$ is neglected).

On the other hand, a voltage $(V_B)$ $T_3$ impressed on the base electrode of the transistor $T_3$ is as below, in the absence of the synchronizing pulse:

$$(V_B)\ T_3 = V_{in} - 2\ V_{BE} - (R_4/R_4 + R_5)\ V_{BE}$$

where $V_{in}$ is represented in terms of the input voltage applied to the input terminal I.

Herein, in the case where the base potential $(V_B)$ $T_4$ of the transistor $T_4$ is higher than the base potential $(V_B)$ $T_3$ of the transistor $T_3$, the transistor $T_3$ is in the non-conductive state. The diode $D_1$ is therefore forward-biased, so that the input signal $V_{in}$ passes therethrough to be fed to the transistor $T_7$. In the opposite case, the transistor $T_3$ enters into the conductive state, and its collector potential loweers. The diode $D_1$ is therefore reverse-biased, so that the input signal $V_{in}$ is cut by the diode $D_1$.

Accordingly, the noise cancellation level difference $V_{N1}$ in the absence of the synchronizing pulse is expressed by:

$$V_{N1} = (V_B)\ )\ T_3 - (V_B)\ T_4 = (R_4/R_4 + R_5)\ V_{BE}$$

In the presence of the synchronizing pulse, namely, in case where the synchronizing signal is fed-back from the synchronization amplifier circuit SA to be applied to the base electrode of the transistor $T_2$, the transistor $T_2$ is rendered conductive and the diode $D_4$ is also rendered conductive. The voltage drop by the resistor $R_4$ is thereby increased, with the result that the base potential of the transistor $T_3$ lowers. The base potential $(V_B)$ $T_3$ of the transistor $T_3$ at this time is expressed by:

$$(V_B)\ T_3 = V_{in} - 2\ V_{BE} - 2\ R_5 + R_6/R_4\ R_5 + R_5\ R_6 + R_6\ R_4\ R_4 \cdot V_{BE}$$

Accordingly, the noise cancellation level difference $V_{N2}$ in the presence of the synchronizing pulse is represented by;

$$V_{N2} = 2\ R_5 + R_6/R_4\ R_5 + R_5\ R_6 + R_6\ R_4\ R_4 \cdot V_{BE}$$

If silicon (Si) is used as the semiconductor material of the integrated semiconductor circuit, the forward voltage drops $V_{BE}$ of the transistors and diodes will be approximately 0.7 V. Accordingly, if the resistances of the resistors $R_4 - R_6$ are set at values as given in FIG. 3, the noise cancellation level differences $V_{N1}$ and $V_{N2}$ will become as follows:

$$V_{N1} = 0.56\ V,\ V_{N2} = 0.95\ V$$

Figure 4:
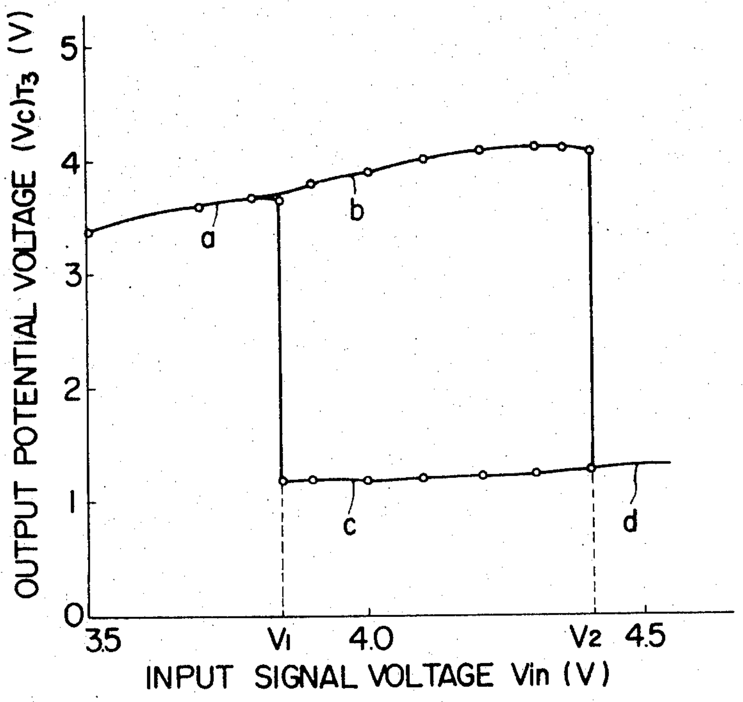
FIGS. 4 and *a* through 5*c* are characteristic diagrams of the noise canceller circuit in FIG. 3.

FIG. 4 illustrates the characteristics of the noise canceller circuit having such a variable noise cancellation level difference. The diagram illustrates the relationship between the input signal $V_{in}$ and the output potential $(V_C)$ $T_3$ of the diode gate $D_1$ (namely, the collector potential of the transistor $T_3$) at the time when a DC voltage of 2.5 V is applied to the base electrode of the transistor $T_6$, assuming that the standard peak synchronization value $V_P$ is approximately 3.4 V and that the base potential $(V_B)$ $T_6$ of the transistor $T_6$ becomes approximately 2.5 V.

Plots in the figure are measured points. $V_1$ indicates a noise cancelling voltage which is determined by the noise cancellation level difference $V_{N1}$ in the absence of the synchronizing pulse, and which is equal to $(V_P + V_{N1})$. $V_2$ represents a noise cancelling voltage which is determined by the noise cancellation level difference $V_{N2}$, and which is equal to $(V_P + V_{N2})$.

As understood from the graph, in the case where the input signal $V_{in}$ is lower than the noise cancelling voltage $V_1$, the output voltage $(V_C)$ $T_3$ of the diode gate $D_1$ follows the input signal $V_{in}$ along a curve *a*.

In the absence of the synchronizing pulse, when the input signal $V_{in}$ exceeds the noise cancelling voltage $V_1$, the output potential $(V_C)$ $T_3$ lowers abruptly. It becomes substantially independent of the input signal $V_{in}$, as is represented by a curve *c*.

On the other hand, in the presence of the synchronizing pulse, even when the input signal $V_{in}$ becomes larger than the noise cancelling voltage $V_1$, the output potential $(V_C)$ $T_3$ substantially follows the input signal $V_{in}$ insofar as the noise cancelling voltage $V_2$ is exceeded (refer to a curve *b*).

When the input signal $V_{in}$ becomes larger than the noise cancelling voltage $V_2$, the output potential $(V_C)$ $T_3$ becomes small substantiallly independently of the input signal (refer to a curve *d*).

The operation of the noise canceller circuit having such variable noise cancellation level difference, will be described hereunder with reference to FIG. 5. In the figure, $(V_B)$ $T_2$ indicates the output potential of the synchronization amplifier circuit, namely, the synchronizing signal fed-back to the base electrode of the transistor $T_2$. Signals depicted over the input signals $V_{in}$ by broken lines are the noise cancelling voltages.

As illustrated in FIG. 5*a*, in the case where a noise is superposed on the synchronizing signal and where the compound video signal exceeds the noise cancelling voltage $V_1$ at the usual time, the synchronizing signal already separated by the synchronization circuit is fed-back to the transistor $T_2$ to increase the noise cancelling voltage to $V_2$, and hence, the noise canceller circuit exerts no action. Accordingly, a signal having the same wave form as the input signal $V_{in}$ appears at the output of the diode gate $D_1$. At this time, the noise is left superposed on the synchronizing signal. It is attenuated by the low-pass filter composed of the resistor $R_8$ and the capacitor $C_3$, the noise suppressor filter previously referred to, or the saturation type transistor $T_{13}$ in the synchronization amplifier SA.

In the case where the amplitude of the input signal $V_{in}$ increases and where the peak synchronization value $V_P$ exceeds the noise cancelling voltage $V_1$, the respective signals become as shown in FIGS. 5*b* or 5*c*.

As illustrated in FIG. 5*b*, the black level $V_B$ of the compound video signal $V_{in}$ rises close to the peak synchronization value at the usual time $V_P$, or as illustrated in FIG. 5*c*, the pedestal level $V_B$ is fed as the peak value of the compound video signal $V_{in}$ to the synchronization separator circuit by the noise canceller circuit NC, so that the synchronization separator circuit SS (utilizing the amplitude separation) feeds the level as the synchronizing signal into the synchronization amplifier circuit SA. Since the synchronization amplifier circuit SA employs the transistor $T_{13}$ adapted to operate in the saturation region, the signal corresponding to the black level $V_B$ is fed-back to the base electrode of the transistor $T_2$ with a delay of a time $t_d$. The delay time $t_d$ is about 0.5$\mu$S. The signal corresponding to the black level $V_B$ ought intrinsically to end at a point A, but it ends at a point B due to the addition of the delay time $t_d$ . Consequently, the noise cancelling voltage is held at $V_2$ up to at least the point B, and the synchronizing signal beginning from the point A is supplied to the synchronization circuit in that condition up to at least the point B without being cancelled by the noise canceller circuit. The synchronizing signal from the point A to the point B is fed-back through the synchronization circuit to the noise canceller circuit NC, so that it functions so as to maintain the noise cancelling level, as raised to the value $V_2$. By repetition of such operation, the noise cancelling voltage is held at $V_2$ until the lapse of the time $t_d$ after disappearance of the synchronizing pulse. Accordingly, the synchronizing signal is neither extinguished nor continues to disappear due to the noise canceller circuit as is done in the prior art even if its peak value is raised. The output voltage $(V_C)$ $T_3$ of the diode gate $D_1$ becomes equal to the input signal $V_{in}$.

In this manner, the signal having passed through the diode gate $D_1$ is fed to the AGC circuit with its peak value held high. The AGC circuit detects it, and functions so as to lower the amplitude of the compound video signal. After a short time, the normal compound video signal adjusted by the AGC circuit enters the input terminal I.

As described above, in accordance with the present invention, the erroneous operation of the noise canceller circuit as previously stated can be prevented without degrading the noise cancelling capability at no synchronizing pulse.

What is claimed is:

1. In a noise canceller circuit for television including comparison means for comparing the level of a compound video signal with a reference level and cancelling means for cancelling those portions of said compound video signal whose amplitude exceeds said reference level, the improvement comprising level shift means for increasing said reference level only during periods when said compound video signal includes a synchronization pulse, a synchronization separator circuit connected to receive said compound video signal, and delay means connected between the output of said synchronization separator circuit and said level shift means for actuating said level shift means with a delay.

2. The noise canceller circuit of claim 1 further including a gate circuit responsive to the output of said comparison means for selectively connecting said compound video signal to said synchronization separator circuit.

3. A noise canceller circuit for connecting a compound video signal to a synchronization separator circuit in a television receiver system, comprising gate means for selectively connecting said compound video signal to said synchronization separator circuit, reference voltage generating means connected to the output of said gate means for generating a reference voltage, comparison means responsive to the relative levels between first and second input signals for actuating said gate means to connect said compound video signal to said synchronization separator circuit only when the level of said first signal exceeds the level of said second signal, and level shift means receiving said compound video signal and responsive to an output from said synchronization separator circuit for shifting the D.C. level of said compound video signal, the outputs of said level shift means and said reference voltage generating means being connected to said comparison means as said first and second signals, respectively.

4. A noise canceller circuit as defined in claim 3 wherein said level shift means comprises means for detecting the peak value of said compound video signal and applying said detected peak value to one input of said comparison means and means reponsive to an output from said synchronization separator circuit for reducing the level of said detected peak value applied to said one input of said comparison means.

5. A noise canceller circuit as defined in claim 3 wherein a delay circuit is connected between the output of said synchronization separator circuit and said level shift means.

6. A noise canceller circuit as defined in claim 5 wherein said delay means comprises a saturation type transistor.

7. A noise canceller circuit as defined in claim 5 wherein said level shift means comprises first and second diodes and a first resistor connected to a source of said compound video signal, second and third resistors connected in series across said second diode, the point of connection of said second and third resistors being connected to one input of said comparison means, a fourth resistor and a third diode connected in series across said third resistor, and a first transistor connected between the point of connection of said fourth resistor and said third diode and ground, the base of said first transistor being connected to the output of said synchronization separator circuit through said delay means.

8. A noise canceller circuit as defined in claim 7 wherein said gate means comprises a fourth diode connected between said source of said compound video signal and the output of said comparison means, so that said fourth diode is selectively back-biased by said comparison means.

9. A noise canceller circuit as defined in claim 8 wherein a filter circuit is connected between the point of connection of said fourth diode and said comparison means and the input of said synchronization separator circuit.

* * * * *